US010075360B2

(12) United States Patent
Vasseur et al.

(10) Patent No.: US 10,075,360 B2
(45) Date of Patent: Sep. 11, 2018

(54) MONITORING NODE LIVENESS IN LOW-POWER LOSSY NETWORKS

(71) Applicant: Cisco Technology, Inc., San Jose, CA (US)

(72) Inventors: Jean-Philippe Vasseur, Saint Martin d'Uriage (FR); Grégory Mermoud, Veyras (CH); Jonathan W. Hui, Belmont, CA (US); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 804 days.

(21) Appl. No.: 14/165,450

(22) Filed: Jan. 27, 2014

(65) Prior Publication Data

US 2015/0195176 A1 Jul. 9, 2015

Related U.S. Application Data

(60) Provisional application No. 61/925,209, filed on Jan. 8, 2014.

(51) Int. Cl.
*G06F 15/16* (2006.01)
*H04L 12/26* (2006.01)
*H04L 12/24* (2006.01)

(52) U.S. Cl.
CPC ............. *H04L 43/12* (2013.01); *H04L 41/16* (2013.01); *H04L 43/08* (2013.01); *Y04S 40/168* (2013.01)

(58) Field of Classification Search
USPC ................ 709/224, 206; 455/127.5; 370/338
See application file for complete search history.

(56) References Cited

U.S. PATENT DOCUMENTS

| | | | |
|---|---|---|---|
| 7,146,419 B1 | 12/2006 | O'Rourke et al. | |
| 7,496,659 B1 | 2/2009 | Coverdill et al. | |
| 8,134,992 B1* | 3/2012 | Nam .................. | H04W 72/1215 370/338 |
| 8,356,997 B1* | 1/2013 | Bergeron .................. | G09B 7/04 434/323 |
| 2007/0162963 A1* | 7/2007 | Penet ...................... | G06F 21/41 726/5 |
| 2007/0275677 A1* | 11/2007 | Hameed ................ | G06F 1/3209 455/127.5 |

(Continued)

OTHER PUBLICATIONS

Vasseur, et al., "Techniques for Monitoring Node Liveness in Low-Power Losssy Networks", U.S. Appl. No. 61/925,209, filed Jan. 8, 2014, 47 pages, U.S. Patent and Trademark Office, Alexandria, VA.

*Primary Examiner* — Tammy Nguyen
(74) *Attorney, Agent, or Firm* — Parker Ibrahim & Berg LLP; James M. Behmke; Stephen D. LeBarron

(57) ABSTRACT

In one embodiment, a learning machine may be used to select observer nodes in a LLN such that the liveness of one or more nodes of interest may be monitored indirectly. In particular, a management device may receive network data on one or more network traffic parameters of a computer network. The management device may then determine, based on the network data, a candidate list of potential observer nodes to monitor activity or inactivity of one or more subject nodes. The management device may then dynamically select, using a machine learning model, a set of optimized observer nodes from the candidate list of potential observer nodes.

17 Claims, 12 Drawing Sheets

(56) References Cited

U.S. PATENT DOCUMENTS

| | | | |
|---|---|---|---|
| 2011/0001603 A1* | 1/2011 | Willis | G07C 9/00039 340/5.2 |
| 2011/0191246 A1* | 8/2011 | Brandstetter | G06Q 30/02 705/59 |
| 2012/0117208 A1 | 5/2012 | Shaffer et al. | |
| 2014/0092753 A1 | 4/2014 | Vasseur et al. | |
| 2014/0095864 A1 | 4/2014 | Dasgupta et al. | |
| 2014/0127989 A1* | 5/2014 | Judd | G01S 19/25 455/24 |
| 2014/0172989 A1* | 6/2014 | Rubinstein | H04L 51/12 709/206 |
| 2015/0195145 A1* | 7/2015 | Di Pietro | G06N 99/005 706/12 |
| 2015/0201236 A1* | 7/2015 | Al Remeithi | H04N 21/44218 348/77 |
| 2015/0356626 A1* | 12/2015 | Chawla | H04W 4/025 705/14.66 |
| 2016/0036750 A1* | 2/2016 | Yuan | H04L 51/14 709/206 |
| 2016/0110499 A1* | 4/2016 | Donnet | G06F 19/22 506/2 |

\* cited by examiner

ALGORITHM A

```
L_candidates = all_nodes
L_observers = []

while L_observed is not empty:
        lambda_max = 0
        n_max = none
        obs_max = []

for each node n_i in L_candidates:
                lambda_i = 0
                obs_i = []

for each edge n_i -> n_j with n_j in L_observed:
                        lambda_i += lambda_{i,j}
                        append n_j tp obs_i if lambda_i > lambda_max:
                        n_max = n_i
                        lambda_max = lambda_i
                        obs_max - obs_i append n_max to L_observers
        remove n_max from L_candidates
        remove nodes in obs_max from L_observed
```

FIG. 10

EQUATION 1: $\quad p_{ij}^k \dfrac{[\tau_{ij}(t)]^{\alpha}[n_{ij}(t)]^{\beta}}{\Sigma_{tco(j)}[\tau_{lj}(t)]^{\alpha}[n_{lj}(t)]^{\beta}}$ EQUATION 2: $\quad \delta_{ij} = N_i * b_i * r_i$ EQUATION 3: $\quad \tau_{ij}(t+1) = (1-p) * \tau_{ij}(t) + \Sigma_k \Delta\tau_{ij}^k$ EQUATION 4: $\quad \Delta\tau_{ij}^k = \begin{cases} \dfrac{Q}{D_k} & \text{if ant k assigned } n_j \text{ to } n_i \text{ in its solution} \\ 0 & \text{otherwise} \end{cases}$

MONITORING NODE LIVENESS IN LOW-POWER LOSSY NETWORKS

RELATED APPLICATIONS

This application claims priority to U.S. Provisional Application No. 61/925,209, filed Jan. 8, 2014, entitled: TECHNIQUES FOR MONITORING NODE LIVENESS IN LOW-POWER LOSSY NETWORKS, by Vasseur et al., the contents of which are herein incorporated by reference.

TECHNICAL FIELD

The present disclosure relates generally to computer networks, and, more particularly, to the use of learning machines for liveness reporting within computer networks.

BACKGROUND

Low-power and lossy networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One of the keys in managing the multitude of LLN devices is the ability to effectively poll the devices for their liveness, e.g., whether the device is engaged in network activity. For example, when supporting managed services, e.g., remote infrastructure management (RIM), the end user requires that the status of each device is accurately detected. Problematically, the "state polling" approach, whereby a network management system (NMS) retrieves state information from a device using a protocol such as Simple Network Management Protocol (SNMP), or even a lighter protocol such as Constrained Application Protocol (CoAP), consumes excessive amounts of bandwidth, and thus is not ideal for implementation in LLNs. Furthermore, implicitly detecting network activity via traffic observation, e.g., by using Deep Packet Inspection (DPI) on traffic sent through a Field Area Router (FAR), may not be possible with "quiet" devices.

BRIEF DESCRIPTION OF THE DRAWINGS

The foregoing and other objects, features, aspects and advantages of the embodiments disclosed herein will become more apparent from the following detailed description when taken in conjunction with the following accompanying drawings.

FIG. 10 illustrates an example algorithm for optimized observer node identification;

FIG. 11 illustrates four example equations for use in optimized observer node identification.

Figure 1:
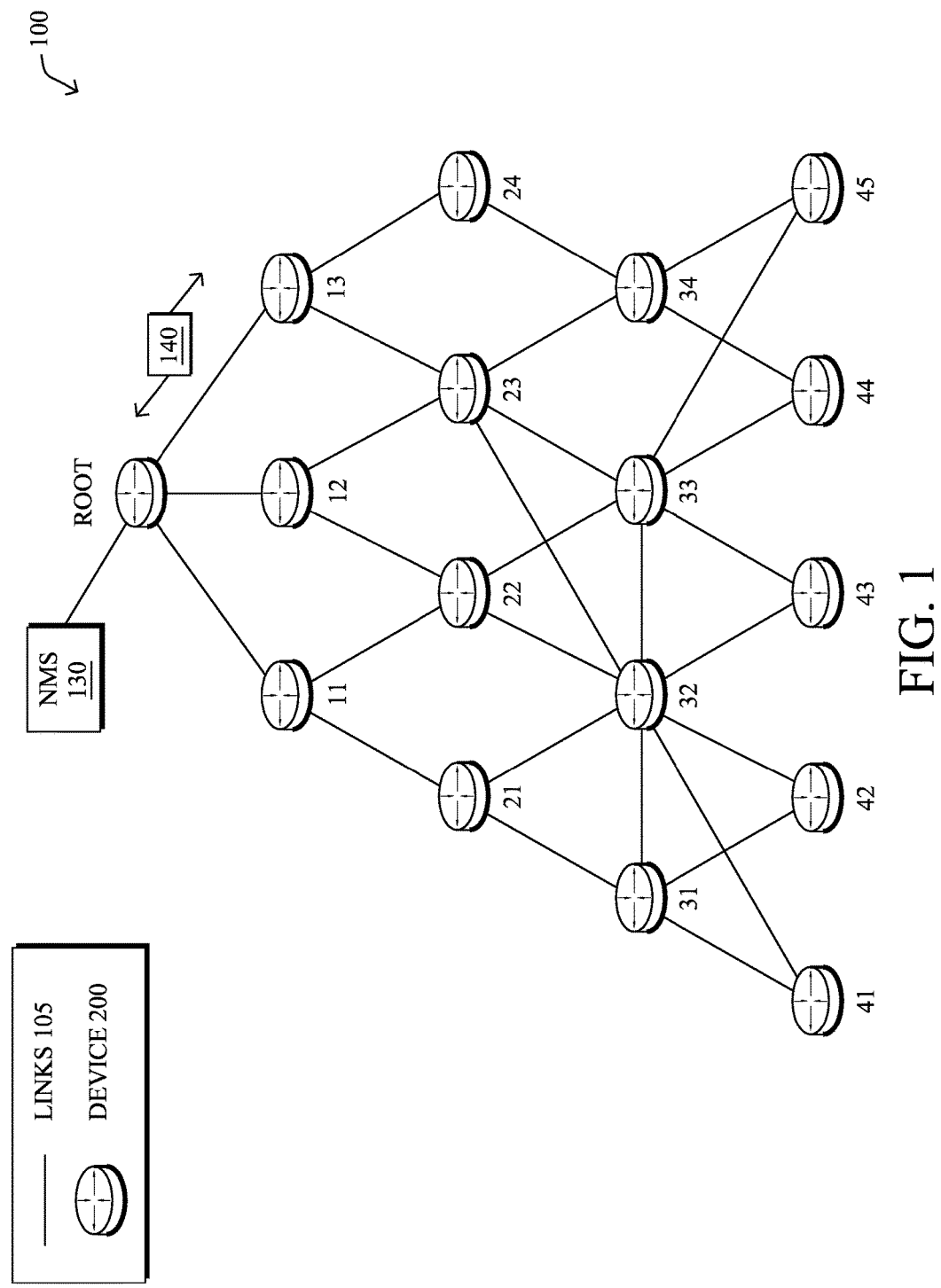
FIG. 1 illustrates an example communication network.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

Overview

According to one or more embodiments of the disclosure, techniques are shown and described relating to liveness reporting of low power nodes in a low-power and lossy networks (LLNs). In the disclosed embodiments, a learning machine may be used to select observer nodes in a LLN such that the liveness of one or more nodes of interest may be monitored indirectly. In particular, a management device may receive network data on one or more network traffic parameters of a computer network. The management device may then determine, based on the network data, a candidate list of potential observer nodes to monitor activity or inactivity of one or more subject nodes. The management device may then dynamically select, using a machine learning model, a set of optimized observer nodes from the candidate list of potential observer nodes, thus requiring minimal overhead in contrast with existing techniques.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links, such as common carrier telephone lines, optical lightpaths, synchronous optical networks (SONET), synchronous digital hierarchy (SDH) links, or power-line communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100. Illustratively, computer network 100 comprises devices 200 (e.g., labeled as "root," "11," "12," . . . "45"), as described in FIG. 2 below, interconnected by communication links 105. For instance, the links 105 may be wired links or shared media (e.g., wireless links, PLC links, etc.) where certain devices 200, such as routers, sensors, computers, actuators, and the like, may be in communication with other nodes 200, based on distance, signal strength, current operational status, location, and the like. Additionally, a network management server (NMS) 130 may be in communication with the network 100. For the purposes of the present disclosure, the computer network 100 may be of any suitable type of network, including, but not limited to, an LLN. Further, the devices 200 may be referred to as "devices" or "nodes" interchangeably.

Those skilled in the art will understand that any number of nodes, devices, links, etc. may be used in a computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the devices 200 of the computer network 100 using predefined network communication protocols such as certain known wired protocols, wireless protocols (e.g., IEEE Std. 802.15.4, WiFi, Bluetooth®, etc.), LLN protocols, or other shared-media protocols where appropriate (e.g., PLC). In this context, a protocol consists of a set of rules defining how the nodes interact with each other.

Figure 2:
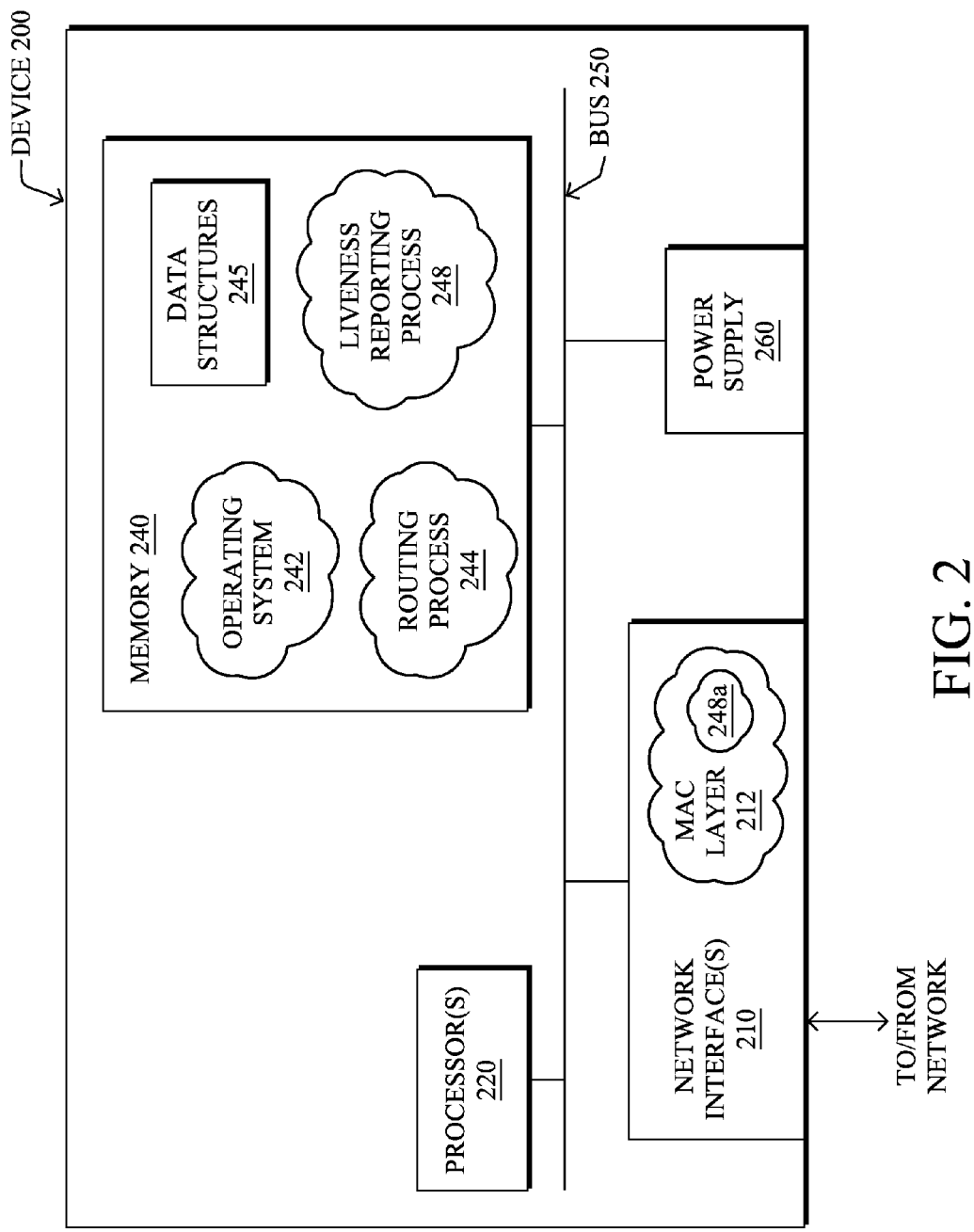
FIG. 2 illustrates an example network device/node.

FIG. 2 is a schematic block diagram of an example node/device 200 that may be used with one or more embodiments described herein, e.g., as shown in FIG. 1. The device may comprise one or more network interfaces 210 (e.g., wireless/channel-hopping), one or more processors 220, a memory 240, and a power supply 260 (e.g., plug-in, battery, etc.), interconnected by a system bus 250.

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art. The device 200 may have multiple different types of network interfaces 210, e.g., wireless and wired/physical connections, and that the view herein is merely for illustration. In addition, the interfaces 210 may comprise an illustrative media access control (MAC) layer module 212 (and other layers, such as the physical or "PHY" layer, as would be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor(s) 220 and the network interface(s) 210 for storing software programs and data structures associated with the embodiments described herein. Note that certain devices may have limited memory or no memory (e.g., no memory for storage other than for programs/processes operating on the device). The processor(s) 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "liveness reporting" process 248, as described in greater detail below. Note that while the liveness reporting process 248 is shown in centralized memory 240, alternative embodiments provide for the asynchronous broadcast communication process to be specifically operated within the network interface(s) 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor(s) 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR).

Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-power and lossy networks (LLNs). LLNs, e.g., certain sensor networks, may be used in a myriad of applications such as for "Smart Grid" and "Smart Cities." LLNs are comprised of anything from a few dozen and up to thousands or even millions of LLN routers, and support point-to-point traffic (e.g., between devices inside the LLN), point-to-multipoint traffic (e.g., from a central control point, such as the root node, to a subset of devices inside the LLN) and multipoint-to-point traffic (e.g., from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Due to their underlying attributes, LLNs face a number of challenges. For example, LLNs are a class of network in which both the routers and their interconnect are "constrained." This means that LLN routers typically operate with constraints, e.g., processing power, memory, and/or energy (e.g., batteries). Also, their interconnects are characterized by, for example, high loss rates, low data rates, and/or instability.

Additionally, LLNs communicate over a physical medium that is strongly affected by environmental conditions that change over time. Some examples include temporal changes in interference (e.g., other wireless networks or electrical appliances), physical obstruction (e.g., doors opening/closing or seasonal changes in foliage density of trees), and propagation characteristics of the physical media (e.g., temperature or humidity changes). The time scales of such temporal changes can range between milliseconds (e.g., transmissions from other transceivers) to months (e.g., seasonal changes of outdoor environment).

Moreover, low-cost and low-power designs limit the capabilities of the transceiver. In particular, LLN transceivers typically provide low throughput and typically support limited link margin. Therefore, the effects of interference and environmental changes to LLNs are visible to link and network protocols.

As noted above, one of the keys in managing the multitude of LLN devices is the ability to effectively poll the devices for their liveness, e.g., whether the device is engaged in network activity. For example, when supporting managed services, e.g., remote infrastructure management (RIM), the end user requires that the status of each device is accurately detected. Problematically, the "state polling" approach, whereby a network management system (NMS) retrieves state information from a device using a protocol such as Simple Network Management Protocol (SNMP), or even a lighter protocol such as Constrained Application Protocol (CoAP), consumes excessive amounts of bandwidth. Furthermore, implicitly detecting network activity via traffic observation, e.g., by using Deep Packet Inspection (DPI) on traffic sent through a Field Area Router (FAR), may not be possible with "quiet" devices, or is simply not applicable in networks where P2P traffic is not transmitted via the FAR, e.g., in an RPL Storing Mode.

Liveness Reporting Using a Distributed Approach

The techniques herein avoid relying on explicit polling of low power devices, which is too costly, or implicit activity detection via traffic observation, which may not be possible with quiet devices, especially within the context of LLNs. That is, the disclosed embodiments improve on existing methodologies by using a distributed approach in reporting liveness, and in particular, by electing a minimal set of "observer" nodes among the nodes in an LLN to generate and transmit "activity" reports about other nodes in the LLN back to a monitoring system, e.g., an NMS, in a highly efficient manner.

In particular, the techniques herein use remote observer nodes in a network to detect activity, or inactivity, by performing local traffic observations, which contrasts with usual liveness detection mechanisms used in IP networks (e.g., Keep-Alive, DPI, node polling). In further contrast with existing approaches, a link may be used for liveness detection and not considered as viable for traffic forwarding. A minimum set of observers is computed in order to guarantee that each node requiring liveness detection is observed by a set of K nodes, for a dynamic (in)activity detection period X. Observer selection may also take into account the routing topology to further increase the robustness of the whole liveness system and/or the detection time. Activity reports are then propagated through the network in a compressed fashion so as to reduce the traffic overhead.

Specifically, according to the disclosed embodiments, liveness reporting is performed using a distributed approach. The embodiments illustratively include a management node that is configured to receive a message containing an indication of activity or inactivity of one or more subject nodes, and determine which of the one or more subject nodes are active based on the received message. The indication is derived from one or more observer nodes observing network traffic of the one or more subject nodes. The embodiments further include one or more observer nodes configured to observe network traffic of the one or more subject nodes in the network, generate the message containing the indication of activity or inactivity of the one or more subject nodes, and transmit the message to the management node.

Illustratively, the techniques described herein may be performed by hardware, software, and/or firmware, such as in accordance with the liveness reporting process 248, which may contain computer executable instructions executed by the processor(s) 220 (or an independent processor of network interface(s) 210) to perform functions relating to the techniques described herein, e.g., in conjunction with routing process 244, as depicted in FIG. 2. The techniques described herein may be processed by similar components that are understood in the art to be operable to perform liveness reporting.

Operationally, the techniques herein generally relate to, but are not limited to, performing liveness reporting using a distributed approach. For example, a minimal set of "observer" nodes may be elected amongst all nodes in an LLN. The observer nodes may generate "activity" reports regarding traffic activity, or inactivity, of other nodes in the LLN, and transmit the reports to a monitoring system, e.g., an NMS. Indeed, many MAC layers generate periodic traffic using link local multicast or broadcast; such activity/traffic is used as an indication of liveness of the node and can only be observed by other nodes in the vicinity, i.e., in RF or PLC range, as opposed to explicit Keep-Alive messages. As should be understood, other signs of local network activity may be used, in addition to, or instead of, MAC link local activity.

Figure 3:
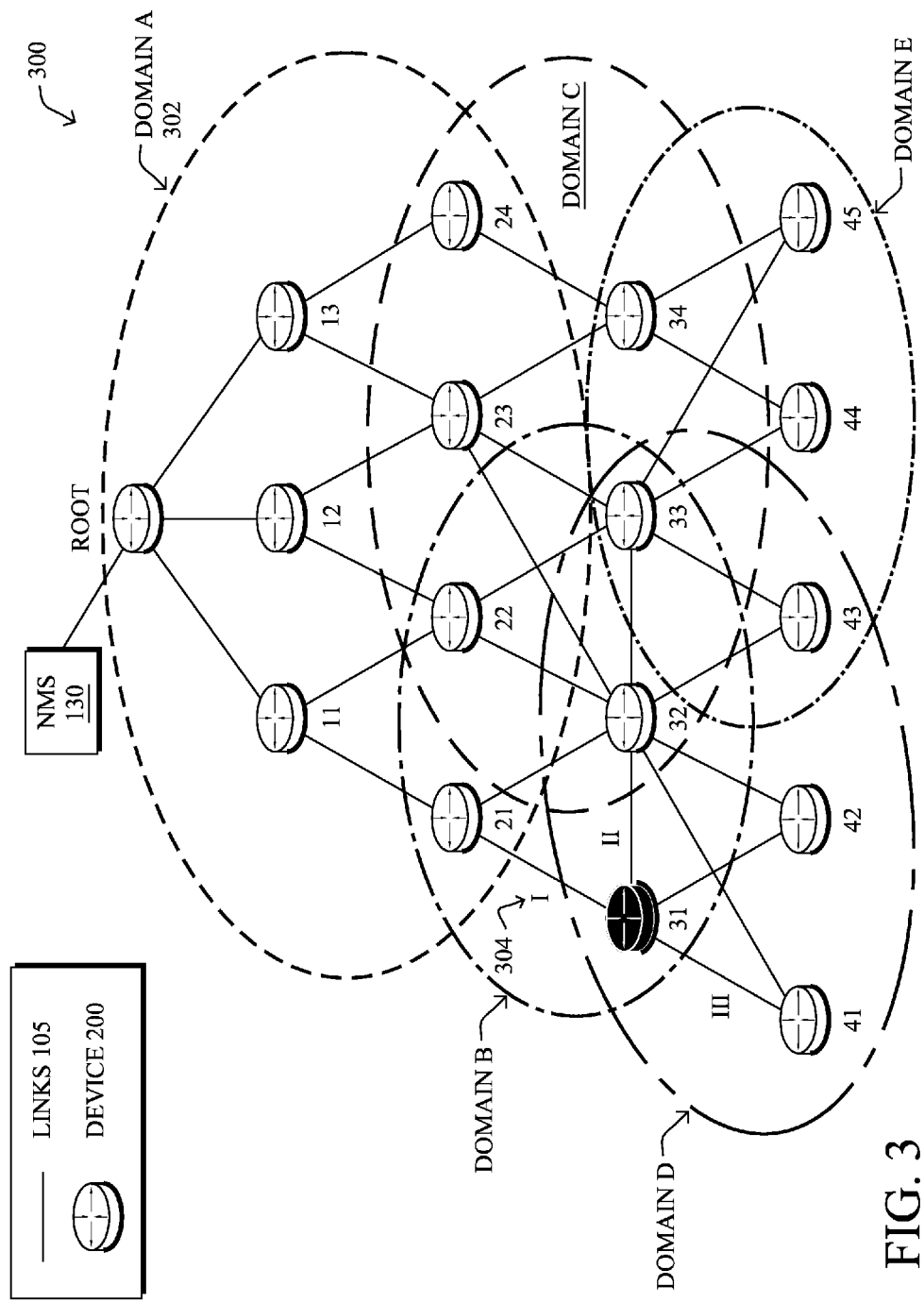
FIG. 3 illustrates an example network of nodes grouped according to node domains.

FIG. 3 illustrates an example network of nodes grouped according to node domains. As shown in FIG. 3, the network 300 comprises devices 200 interconnected to one another via communication links 105, in the manner illustrated in FIG. 1. The devices 200 of network 300 are grouped according to the node domains 302, whereby each of the nodes within a single node domain can detect traffic from, i.e., "hear," one another. Moreover, the communication links 105 between the nodes are characterized by according to their respective link metric 304.

The node domains 302 encompass devices 200 which can detect transmissions of one another. For example, the devices within a single node domain 302 may be spatially proximate to one another, have a direct, or indirect, link of communication to the other devices, etc. The node domains 302 may represent, for example, RF domains, whereby each device inside the respective domain is within a particular RF frequency range. Illustratively, the "root" node may detect liveness, e.g., network activity, traffic forwarding, etc., of devices '11', '12', '13', '21', '22', '23' and '24', and vice versa This is because each of the aforementioned nodes are within the same node domain, i.e., node domain 'A'.

Notably, a single device 200 may reside inside multiple node domains 302. For example, device '31' resides within node domain 'B' and 'D'. Therefore, device '31' can detect the liveness of any other device within those node domains 302. Certain centrally located devices within the network, such as device '33' in FIG. 3, or a root node in certain cases, may reside in a multitude of node domains, and may be advantageous when determining the minimum number of "observer" nodes, as described in further detail below.

When determining the node domains 302, each device 200 of the network first builds the list of device from which it can detect network activity, i.e., liveness. In order for one device to detect the traffic of another, a link of acceptable quality must exist between the two. The link may be direct or indirect, e.g., through another device. To determine the quality of the link, the link may be characterized by a suitable link metric, such as the expected transmission count (ETX), which represents the number of expected transmissions of a packet necessary for it to be received without error at its destination, e.g., using a different low pass filter, with higher hysteresis to limit the ETX computation overhead. Any suitable link metric may be utilized, as described in further detail with respect to the link metric 304.

The link metric 304 represents, for example, the strength of the corresponding communication link. Illustratively, 'I' indicates a high-quality link, e.g., ETX~1, 'II' indicates a medium-quality link, and 'III' indicates a low-quality link. Importantly, a link may be used for liveness detection, as described herein, even if it is not considered viable for traffic forwarding, e.g., the link is too weak. In other words, certain links 105 may be used for tracking liveness detection only. This is because the minimum level of required link quality for liveness detection is lower than what would be considered as acceptable for traffic forwarding. The links 105 may be considered as viable for liveness detection if they allow a node to detect whether another node is indeed active, e.g., whether the node forwards network traffic. Accordingly, while only the 'I' and 'II' links may be suitable for forwarding traffic, as the 'III' link is of low-quality, each of the 'I', 'II', and 'III' links may be suitable for liveness detection.

Figure 4A:
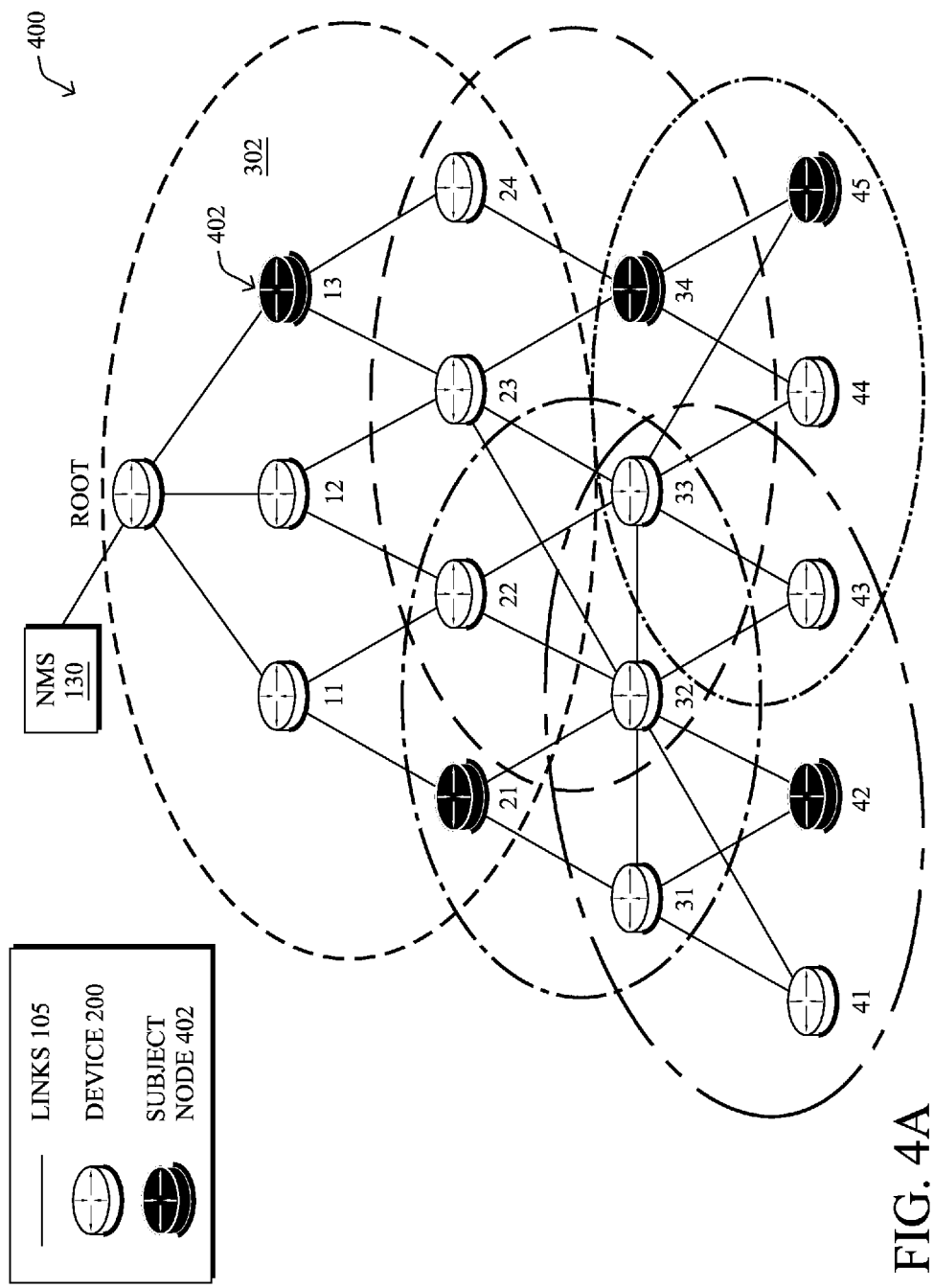
FIGS. 4A and 4B illustrate an example communication network containing designated subject nodes and observer nodes.
Figure 4B:
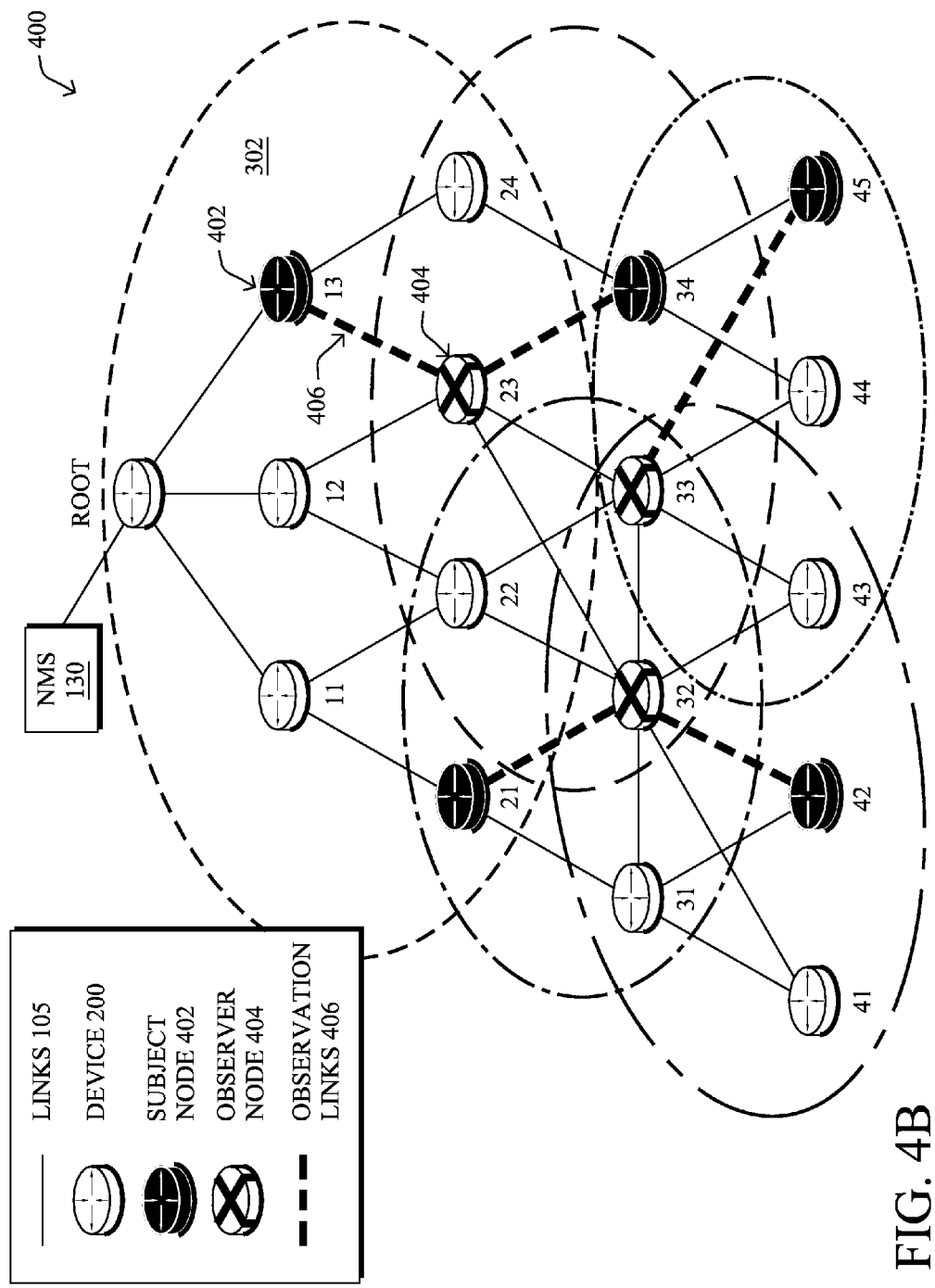

FIGS. 4A and 4B illustrate an example communication network containing designated subject nodes and observer nodes. As shown in FIG. 4A, computer network 400 comprises devices 200 interconnected to one another via communication links 105, in the manner illustrated in FIG. 1. The network 400 further comprises a plurality of node domains 302, in which reside designated "subject" nodes 402, which represent nodes in the network for which the activity must be tracked. The group of one or more subject nodes 402 represents a subset of all nodes of the network. It should be understood that any number or combination of devices may be designated as the subject nodes, i.e., those whose activity must be tracked. Moreover, the subject nodes 402 may coincide with all nodes of the network in cases where it is required to detect the liveness of every network node.

Illustratively, devices '13', '21', '34', '42' and '45' are designated as the subject nodes 402, which means the activity of these devices must be tracked. Importantly, each of the subject nodes 402 resides in varying node domains 302; therefore, nodes which reside in the same node domains should be selected as the observer nodes, as described in detail below. While the aforementioned devices are the designated "subject" nodes, the liveness of all nodes of the network 400 may nonetheless be tracked; however, the priority of reporting the liveness of devices 402 may be higher than that of the remaining devices. For example, when executing a Smart Metering application in an LLN, detecting the activity of the meters themselves may be of the utmost importance.

As shown in FIG. 4B, computer network 400 further comprises a plurality of node domains 302, in which reside the designated "subject" nodes 402, as well as the selected "observer" nodes 404. The group of one or more observer nodes 404 represents a subset of all nodes of the network. It should be understood that any number or combination of devices may be designated as the observer nodes, i.e., those whose track the activity of other devices. Moreover, the observer nodes 404 may coincide with all nodes of the network in cases where performing liveness detection is required for every network node.

For the purposes of the present disclosure, the observer nodes 404 are selected to remotely "observe" the local network activity of the surrounding nodes, for example, via observation links 406 (designated in FIG. 4B by a dashed line). More specifically, the observer nodes 404 observe the network activity of the other nodes inside the corresponding node region. The observation of traffic occurs at an area that is local to the subject nodes 402, e.g., in the surrounding network area, and remote from the NMS 130, i.e., a "management node," rather than explicitly polling the subject nodes. Subsequently, an activity report is generated by the observer nodes 404 and transmitted to the NMS.

In order to increase efficiency of the liveness detection system, the objective in selecting the observer nodes 404 may be to determine the minimum number of observers required to ensure that the network activity of the subject nodes 402 is observed. As should be understood, as the number of local traffic observations, in conjunction with the number of activity report transmissions, decrease, the bandwidth consumed also decreases, thereby increasing the overall efficiency of the liveness reporting system.

In addition, the observer nodes 404 may be selected such that at least a threshold amount of observers (K) observes the activity of each subject node 402 in a particular node domain 302. Doing so allows for selecting a minimum number of observers, thus minimizing the number of activity report transmissions, while guaranteeing that the liveness of each subject node 402 is reported by at least K nodes. It should be understood that K may equal one in cases where it is only necessary for the activity of a subject node 402 to be monitored by a single node. In other cases however, the liveness of node may be so critical that an application may require that each subject node be tracked by at least K>1 nodes, which increases the report traffic generated, but also improves reporting accuracy. The threshold value K may be dynamically adjusted by a Learning Machine, the NMS 130, etc. according to its prediction accuracy in light of the amount of traffic in the network.

Furthermore, the selection of the observer nodes 404 may take into account the routing topology in order to increase the reliability and robustness of the overall activity detection. In order words, observers may be selected in order to make sure that reports would be sent along diverse paths in the network, thereby improving the likelihood of a successful activity report transmission, reducing the probability of collisions and/or interference, and even allowing for load sharing.

Illustratively, devices '23', '32' and '33' are selected as the observer nodes 404. Each observer node 404 is capable of monitoring network activity from the subject nodes 402, and is coupled to the subject nodes via observation links 406. In the network 400, it should be understood that the minimum number of observer nodes 404 required such that the network activity of each subject node 402 is being observed by at least one node is two. As such, in network 400, it may be sufficient to merely select observer nodes '23' and '33'. However, in the event that accurately detecting the liveness of the subject nodes 402 is critical, additional observer nodes may be selected, as described above. Thus, in the network 400, observer node '32' is also selected for liveness reporting, thereby increasing the overall robustness of the liveness reporting system.

Additionally, the network 400 is an example of a network where the threshold amount of observers (K) is set to one. In this regard, each subject node 402 is observed by at least one observer node 404. Indeed, subject nodes '13' and '45' are each observed by one observer node (node '13' is observed by node '23' and node '45' is observed by node '33'); subject node '42' is observed by two observer nodes (node '42' is observed by nodes '32' and '33'); and subject nodes '21' and '34' are each observed by three observer nodes (node '21' is observed by nodes '23', '32' and '33' and node '34' is observed by nodes '23', '32' and '33'). Notably, subject node '21' is observed by observer nodes '23', '32' and '33' in two different node domains 302, i.e., node domains 'A' and 'B'. The number of observers K may be determined dynamically according to the criticality of determining the liveness of an observed node.

Figure 5:
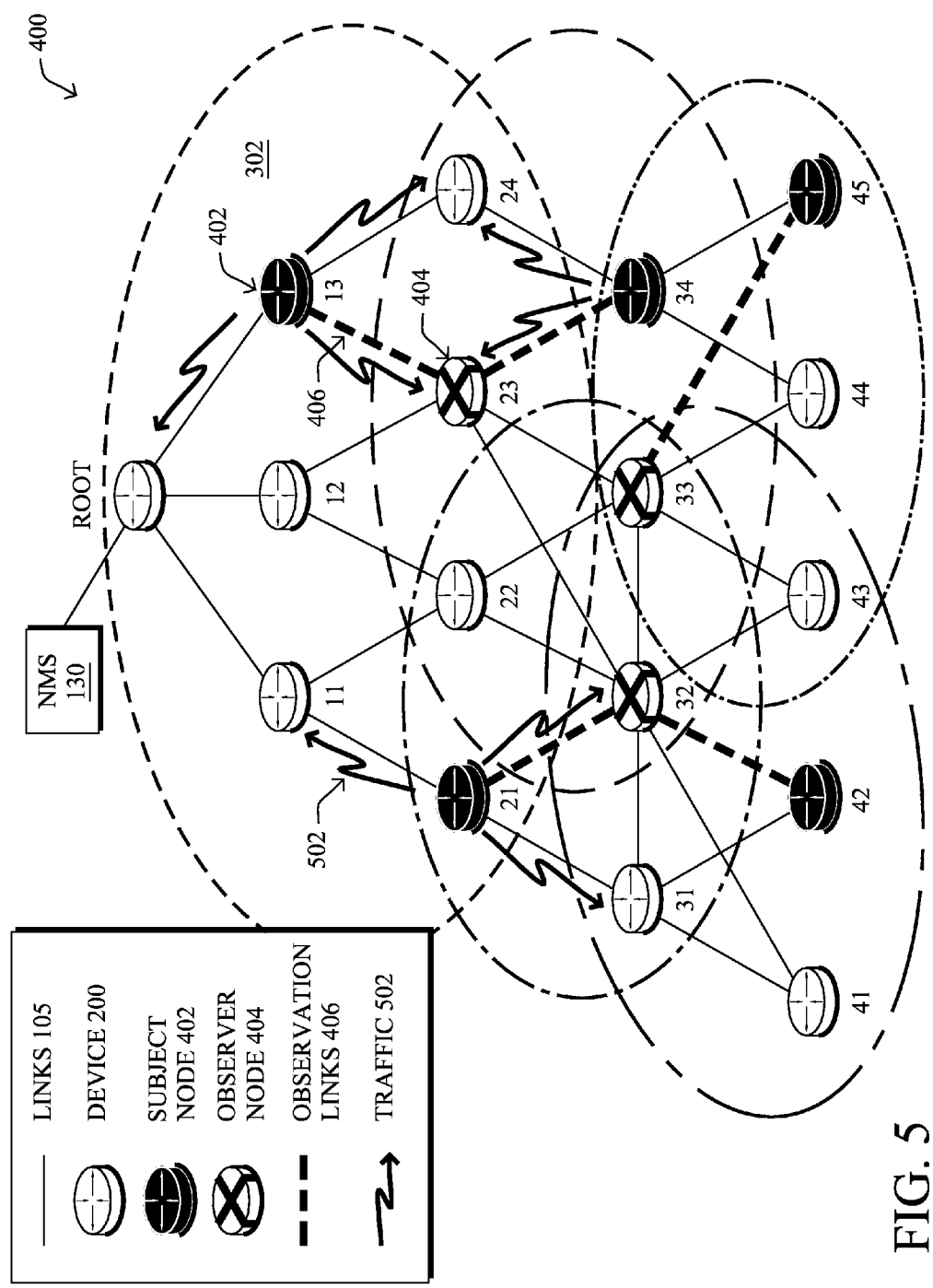
FIG. 5 illustrates an example of network traffic observations.

FIG. 5 illustrates an example of network traffic observations. As shown in FIG. 5, the network 500 comprises devices 200 interconnected to one another via communication links 105, in the manner illustrated in FIG. 1. The network 500 further comprises a plurality of node domains 302, in which reside a plurality of subject nodes 402 and observer nodes 404 interconnected via observation links 406. Additionally, particular subject nodes 402 transmit/forward data 502, i.e., traffic, to surrounding nodes.

As described above, the observer nodes 404 observe the network traffic 502, or in certain cases, the lack thereof, stemming from the subject nodes 402. In FIG. 5, data 502 is transmitted from subject nodes '13', '21' and '34'. The data 502 may be of any acceptable type of transmission. For example, in the case of a Smart Metering application, the data 502 may consist of meter reads, and the data may be transmitted, requested, forwarded, or the like, by the corresponding device. Such activity, e.g., data transmissions, requests, forwards, etc., may be treated as an indication that the corresponding device is "live" (whether the data actually originated at the device is inconsequential).

In contrast, no data is transmitted from subject nodes '42' and '45'. Notably, data 502 is being transmitted to subject node '45'; however, mere data reception, without an explicit request, may not be treated as network activity in particular cases. As should be understood, the configuration of the particular liveness reporting system would determine how to treat such data receptions. A lack of activity, e.g., no evidence of data transmissions, requests, forwards, etc., may be treated as an indication that the corresponding device is "inactive." Importantly, because subject nodes '42' and '45' are located "deep" within the network tree, high latency becomes an issue with existing approaches. This is because when an NMS attempts to explicitly poll/ping such devices, the significant distance between the devices causes a high likelihood of collisions, interference, packet loss, and the like. Therefore, the liveness reporting methodologies disclosed herein, which utilize remote observers with greater proximity to the nodes to be observed, experience increase efficiency over the existing methods.

The observer nodes 404 may observe the network traffic 502 stemming from the subject nodes 402 for a predetermined period of observation time (X). X may be a dynamic parameter provided by the NMS 130, or other application, such as a Learning Machine, according to various factors relating to the liveness reporting system, e.g., available bandwidth, desired accuracy probability, desired transmission route diversity, etc. As such, X may be dynamically adjusted on a node-by-node basis, according to the attributes of the particular node.

Figure 6:
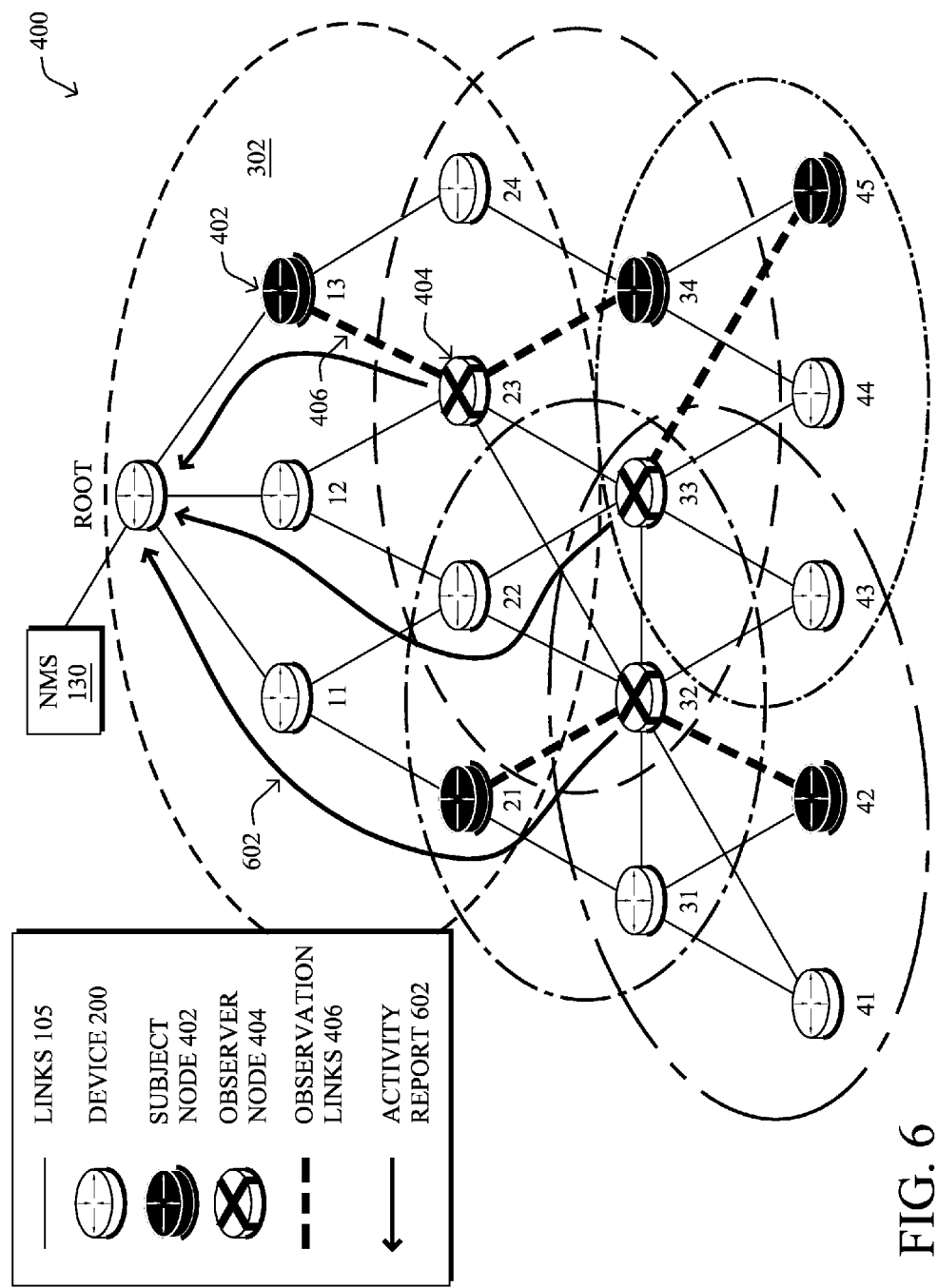
FIG. 6 illustrates an example of activity indication reports.

FIG. 6 illustrates an example of activity indication reports. As shown in FIG. 6, the network 600 comprises devices 200 interconnected to one another via communication links 105, in the manner illustrated in FIG. 1. The network 600 further comprises a plurality of node domains 302, in which reside a plurality of subject nodes 402 and observer nodes 404 interconnected via observation links 406.

After the observer nodes 404 observe the network traffic, or lack thereof, stemming from the subject nodes 402, the observer nodes 404 transmit an activity report 602 indicating the activity of the subject nodes 402. In other words, the observer nodes 404 report a list of the observed nodes which are active and/or inactive to the NMS 130, i.e. "management node," or any other suitable application/device. For the purposes of the present disclosure, an "activity indication" may be used interchangeably with the activity report 602.

The activity report 602 may simply contain a list of active devices, a list of inactive devices, or both. Whether a device is active/live or inactive/dormant is described in further detail above. In addition, the activity report 602 may contain information relating to the specific type of activity the device(s) are engaged in. The activity report 602 may provide an indication of device activity within the predetermined period of observation time (X). In other words, if X is equal to 25 ms, an "active" device is a device which has transmitted/requested/forwarded data within the last 25 ms, whereas an "inactive" device is a device which has not transmitted/requested/forwarded data within the last 25 ms.

Using the activity report 602, a list of active devices may be encoded using a Bloom filter. As would be understood by a person of ordinary skill in the art, a Bloom filter is a well-known space-efficient probabilistic data structure that is used to test whether an element is a member of a set, or in other words, whether a device is an active device. As would be further understood, false positives are possible using the Bloom filter, but false negatives are not. This is due to the bits of space used per element, which under classic Bloom filters, is equivalent to $1.44*\log_2(1/r)$, where r is the false positive rate of the Bloom filter. For instance, a subject node which was observed and reported to the NMS by an observer node, may be encoded by the Bloom filter in a list of active nodes, and thus may be seen as active, although it is not.

Conversely, using the activity report 602, a list of inactive devices may be encoded using a Bloom filter. In such cases, false negatives are possible. In particular, using the Bloom filter to report a lack of activity for a period of time X may lead to false negative, rather than a false positive, from a liveness standpoint. When determining whether to encode a list of active or inactive devices, the observer nodes 404 may be instructed by the NMS 130, i.e., "management node," as to whether to generate a report containing an indication of activity, or an indication of inactivity, of the subject nodes 402. In response, the observer nodes 404 may encode the list containing the instructed indication using the Bloom filter.

The activity reports and/or inactivity reports 602 may be computed on a per-node basis, e.g., the value X is not global, but instead a vector for each node X[i]. This approach may be beneficial should the NMS 130, i.e., "management node," or any other suitable application, require to monitor the liveness of specific subject nodes 402 for a specific amount of time. In this regard, a specialized type-length-value data structure (TLV) may be utilized to carry the corresponding time value X, whereby the TLV may be disseminated across the network using the MAC or Routing protocol, e.g., DIO message with RPL. In addition, another message may be utilized, either a TLV or otherwise, to carry the activity/inactivity report, and to send to a requesting entity, e.g., the NMS, or any other suitable application. The list of requestors may be dynamically discovered by the NMS 130 during an initial registration process, e.g. DHCP. The time value X and the activity/inactivity report may be transmitted within the same message. Notably, transmitting the dynamic time value X, the local network activity/inactivity report, etc. through the network in a compressed fashion may be beneficial by reducing the traffic overhead. However, noncompressed reports may also be used to report such information.

As should be evident based on the above description, utilizing the Bloom filter to encode an activity reports may lead to report that a node is alive, although it is in fact not. Depending on the application, such a false positive may not be problematic; however, with other applications, the consequences may be dramatic, e.g., declaring that a radio activity sensor is alive although it is not. Thus, by dynamically changing how the Bloom filter is used, e.g., whether to encode a report of activity (liveness), or lack of activity, the false positive in the former case may lead to a false negative in the latter case.

Figure 7:
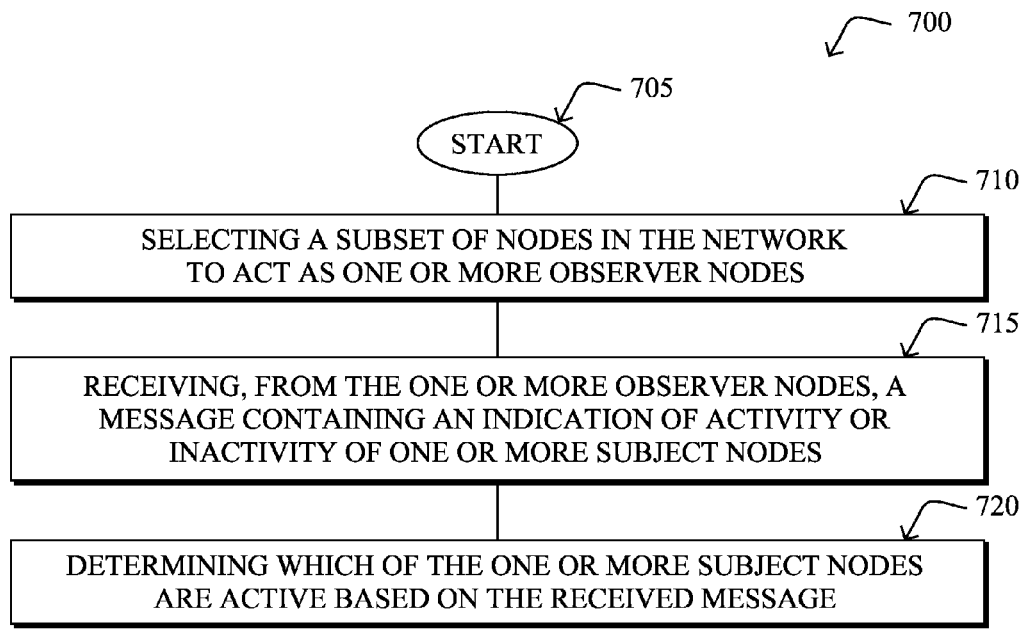
FIGS. 7-9 illustrate example simplified procedures for liveness reporting using a distributed approach in a communication network.
Figure 8:
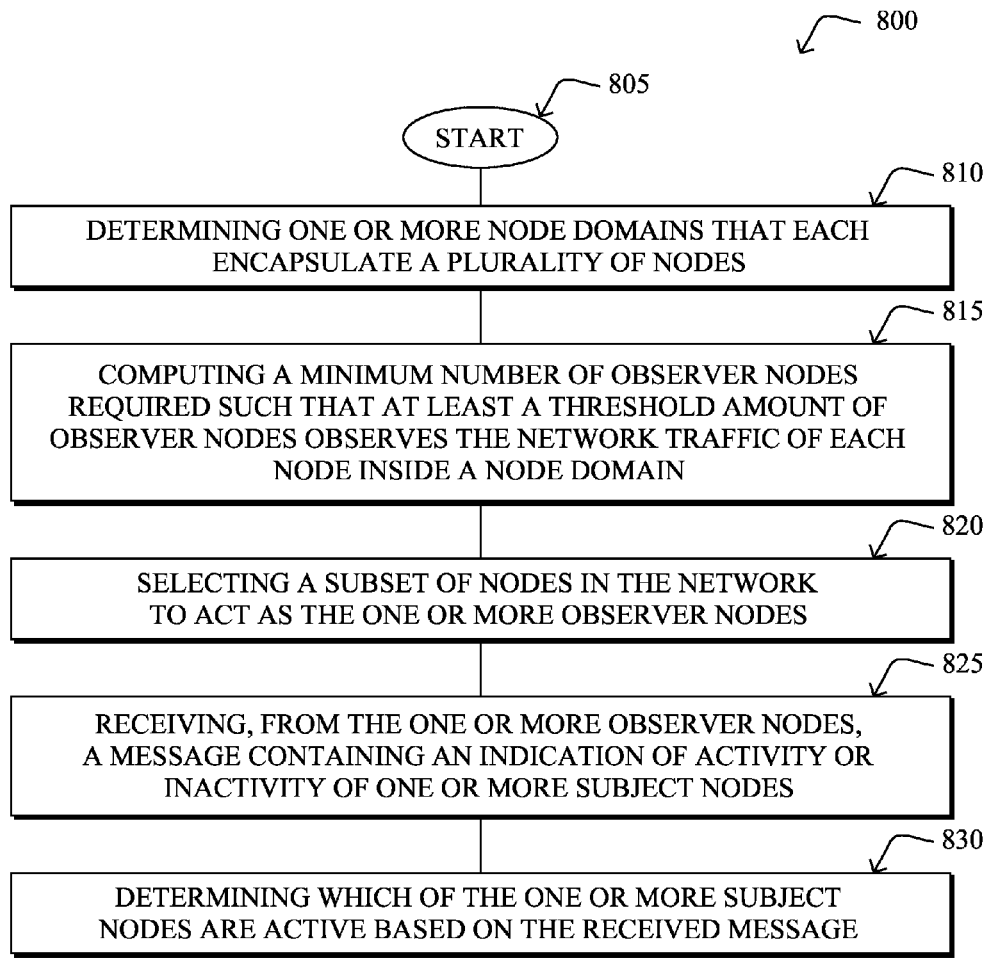
Figure 9:
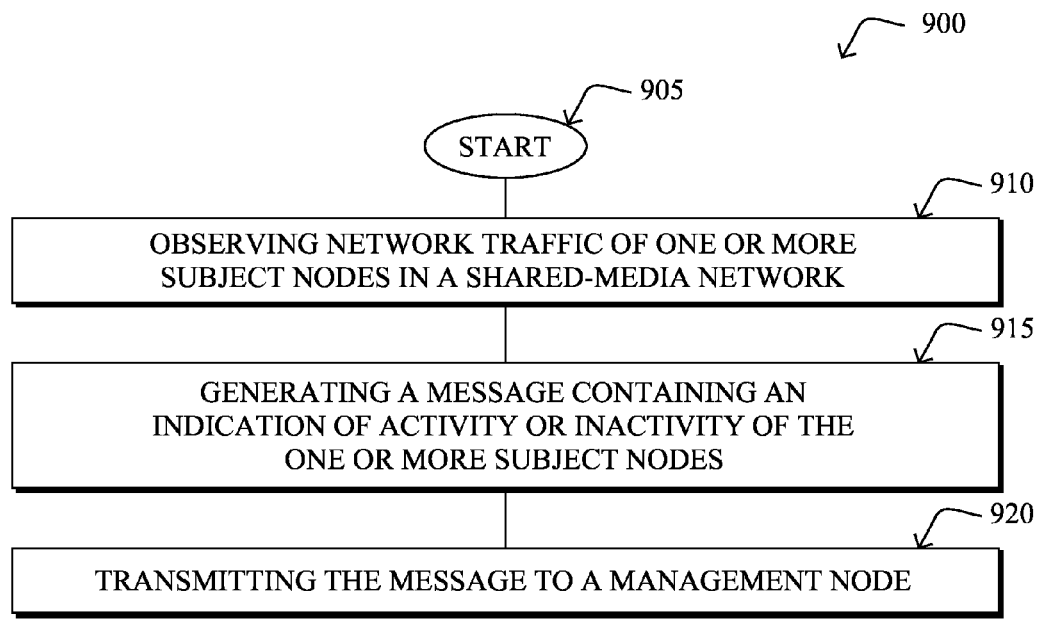

FIGS. 7-9 illustrate example simplified procedures for liveness reporting using a distributed approach in a communication network. As shown in FIG. 7, the procedure 700 may start at step 705, continue to step 710, and so forth, where, as described in greater detail above, asynchronous broadcast communication is performed based on time-based events in channel-hopping networks. Although FIG. 7 depicts steps in a particular order, it should be understood that the depicted embodiment is not limiting, and the particular order is depicted merely for illustration purposes.

At Step 710, the procedure 700 includes selecting a subset of nodes in the network to act as one or more observer nodes. In contrast with existing methodologies, a set of "observer" nodes is selected for tracking activity of a set of "subject" nodes, i.e., devices whose liveness is to be reported. The NMS interacts directly with the observer nodes, rather than the subject nodes themselves, in order to retrieve information about the subject nodes, e.g., whether the devices are "active" or "inactive." Both the one or more observer nodes and the one or more subject nodes represent subsets of all nodes of a network respectively.

In an example embodiment, device activity is detected by observing data transmissions, or lack thereof, at the MAC layer piggybacked in L3 activity reports. For example, IEEE 802.15.4 Enhanced Beacon Requests (EBRs) and Enhanced Beacons (EBs) can be used by an observer to detect that a particular node is "alive" by looking at beacon frequency. A local timer, e.g., dynamic time variable X, as described above, may then be computed accordingly. Notably, such local observation is effective in determining and reporting the liveness of a device, even without using any additional explicit Keep-Alive messages. Thus, by eliminating the need to actively poll/ping the subject nodes from the NMS, the amount of control traffic in the network may be dramatically reduced. Further, by eliminating the need to passively monitor traffic by, for example, using DPI to analyze L2 data packets, which may not be possible with "quiet" devices, the accuracy by which the liveness of a device is reported may be increased.

At Step 715, the procedure 700 further includes receiving, from the one or more observer nodes, a message containing an indication of activity or inactivity of one or more subject nodes. The activity indication is derived from observations of network traffic from the one or more subject nodes made by the one or more observer nodes. After the observer nodes 404 observe the network traffic, or lack thereof, stemming from the subject nodes 402, the observer nodes 404 transmit an activity report 602 indicating the activity of the subject nodes 402. In other words, the observer nodes 404 report a list of the observed nodes which are active and/or inactive to the NMS 130, or any other suitable application/device. Of course, for the purposes of the present disclosure, an "activity indication" may be used interchangeably with the activity report 602.

At Step 720, the procedure 700 further includes determining which of the one or more subject nodes are active based on the received message. The activity report 602 may simply contain a list of active devices, a list of inactive devices, or both. Whether a device is active/live or inactive/dormant is described in further detail above. In addition, the activity report 602 may contain information relating to the specific type of activity the device(s) are engaged in. Activity such as data transmissions, requests, forwards, etc., may be treated as an indication that the corresponding device is "live." In contrast, a lack of activity, e.g., no evidence of data transmissions, requests, forwards, etc., may be treated as an indication that the corresponding device is "inactive."

As shown in FIG. 8, the procedure 800 may start at step 805, continue to step 810, and so forth, where, as described in greater detail above, asynchronous broadcast communication is performed based on time-based events in channel-hopping networks. Although FIG. 8 depicts steps in a particular order, it should be understood that the depicted embodiment is not limiting, and the particular order is depicted merely for illustration purposes.

At Step 810, the procedure 800 includes determining one or more node domains that each encapsulate a plurality of nodes of the network. The node domains 302 encompass devices 200 which can detect transmissions of one another. For example, the devices within a single node domain 302 may be spatially proximate to one another, have a direct, or indirect, link of communication to the other devices, etc. The node domains 302 may represent, for example, RF domains, whereby each device inside the respective domain is within a particular RF frequency range. Notably, a single device 200 may reside inside multiple node domains 302. Therefore, such a device can detect the liveness of any other device within those node domains.

At Step 815, the procedure 800 further includes computing a minimum number of observer nodes required such that at least a threshold amount of observer nodes observes the network traffic of each node inside a node domain. Doing so allows for selecting a minimum number of observers, thus minimizing the number of activity report transmissions, while guaranteeing that the liveness of each subject node 402 is reported by at least the threshold amount (K) of observer nodes. It should be understood that K may equal one in cases where it is only necessary for the activity of a subject node 402 to be monitored by a single node. In other cases however, the liveness of node may be so critical that an application may require that each subject node be tracked by at least K>1 nodes, which increases the report traffic generated, but also improves reporting accuracy.

At Step 820, the procedure 800 further includes selecting a subset of nodes in the network to act as the one or more observer nodes. As described above, the NMS interacts directly with the observer nodes, rather than the subject nodes themselves, in order to retrieve information about the subject nodes, e.g., whether the devices are "active" or "inactive." By eliminating the need to actively poll devices from the NMS, and the need to passively analyze traffic using, e.g., DPI, device liveness reporting may be performed with greater accuracy and lower consumption of bandwidth. Moreover, the objective in selecting the observer nodes 404 may be to determine the minimum number of observers required to ensure that the network activity of the subject nodes 402 is observed. As should be understood, as the number of local traffic observations, in conjunction with the number of activity report transmissions, decrease, the bandwidth consumed also decreases, thereby increasing the overall efficiency of the liveness reporting system.

At Step 825, the procedure 800 further includes receiving, from the one or more observer nodes, a message containing an indication of activity or inactivity of one or more subject nodes. As described above, the activity indication is derived from observations of network traffic from the one or more subject nodes made by the one or more observer nodes. After the observer nodes 404 observe the network traffic, or lack thereof, stemming from the subject nodes 402, the observer nodes 404 transmit an activity report 602 indicating the activity of the subject nodes 402. In other words, the observer nodes 404 report a list of the observed nodes which are active and/or inactive to the NMS 130, or any other suitable application/device. Of course, for the purposes of the present disclosure, an "activity indication" may be used interchangeably with the activity report 602.

At Step 830, the procedure 800 further includes determining which of the one or more subject nodes are active based on the received message. As described above, the activity report 602 may simply contain a list of active devices, a list of inactive devices, or both. Whether a device is active/live or inactive/dormant is described in further detail above. In addition, the activity report 602 may contain information relating to the specific type of activity the device(s) are engaged in. Activity such as data transmissions, requests, forwards, etc., may be treated as an indication that the corresponding device is "live." In contrast, a lack of activity, e.g., no evidence of data transmissions, requests, forwards, etc., may be treated as an indication that the corresponding device is "inactive."

As shown in FIG. 9, the procedure 900 may start at step 905, continue to step 910, and so forth, where, as described in greater detail above, asynchronous broadcast communication is performed based on time-based events in channel-hopping networks. Although FIG. 9 depicts steps in a particular order, it should be understood that the depicted embodiment is not limiting, and the particular order is depicted merely for illustration purposes.

At Step 910, the procedure 900 includes observing network traffic of one or more subject nodes in a shared-media network. The observer nodes 404 observe the network traffic 502, or in certain cases, the lack thereof, stemming from the subject nodes 402. In FIG. 5, data 502 is transmitted from subject nodes '13', '21' and '34'. The data 502 may be of any acceptable type of transmission. For example, in the case of a Smart Metering application, the data 502 may consist of meter reads, and the data may be transmitted, requested, forwarded, or the like, by the corresponding device. Such activity, e.g., data transmissions, requests, forwards, etc., may be treated as an indication that the corresponding device is "live" (whether the data actually originated at the device is inconsequential).

At Step 915, the procedure 900 further includes generating a message containing an indication of activity or inactivity of the one or more subject nodes. The message, e.g., activity report 602, may contain, for example, a list of active devices, a list of inactive devices, or both. In addition, the message may contain information relating to the specific type of activity the device(s) are engaged in. The message may provide an indication of device activity within the predetermined period of observation time (X). In other words, if X is equal to 25 ms, an "active" device is a device which has transmitted/requested/forwarded data within the last 25 ms, whereas an "inactive" device is a device which has not transmitted/requested/forwarded data within the last 25 ms.

At Step 920, the procedure 900 further includes transmitting the message to a management node. The observer nodes 404 may report a list of the observed nodes which are active and/or inactive to the NMS 130, i.e. "management node," or any other suitable application/device. Notably, it is unnecessary for the management node to explicitly poll the subject nodes. Rather, the management node may rely on a minimal set of observer nodes in an LLN to observe local traffic, and generate/transmit activity reports about other nodes in the LLN back to the management node.

It should be understood that the steps shown in FIGS. 7-9 are merely examples for illustration, and certain steps may be included or excluded as desired. Further, while a particular order of the steps is shown, this ordering is merely illustrative, and any suitable arrangement of the steps may be utilized without departing from the scope of the embodiments herein. Moreover, while the procedures 700, 800 and

900 are described separately, certain steps from each procedure may be incorporated into each other procedure, and the procedures are not meant to be mutually exclusive.

Learning Machine Based Observer Node Selection

The optimized selection of one or more observer nodes may be guided by several criteria such as, for example:

1. The set of one or more observer nodes should ensure coverage of the whole set of observed nodes prescribed by the NMS.

2. The detection and observation mechanisms should be robust, so that they may handle the failure of an observer node or nodes. This may be typically achieved by requiring more than one observer node for a given node.

3. The detection mechanism should achieve a predetermined level of confidence. For example, the rate of false positives or false negatives should meet some specific requirements.

4. Observer nodes should be able to report node failures with a given responsiveness. For example, in some specific scenarios, a node failure should be detected and reported with a maximum delay.

5. The traffic generated by the observer nodes must be minimal so as to avoid any further overhead on very constrained networks such as LLNs.

According to the techniques herein, the input to this optimization problem (e.g. optimized selection of one or more observer nodes) may be specified as a list L_observed of observed nodes $n\_i$, along with a desired confidence $c\_i$ and responsiveness $t\_i$. Based on this input, one may then tune each and every parameter of the above-described protocol extension so as to achieve the desired constraints. In particular, the confidence $c\_i$ can be achieved by setting the size of the Bloom filter (thereby reducing the rate of false positives), the reporting rate $r\_j$ of the observer $n\_j$ (thereby reducing the rate of false negatives), or adding some redundancy (i.e., having several observers per node, thereby reducing both false positives and false negatives). The responsiveness $t\_i$ is directly affected by the packet rate lambda_i of the observer node and the reporting rate $r\_j$ of the observers.

During the first phase of the optimization algorithm, each node in the network may report a list of nodes it can hear in its vicinity, along with a measure of the packet rate lambda associated with each observed node. As a result, the list reported by a potential observer $n\_j$ is $\{(n\_1, \text{lambda}\_1), \ldots, (n\_k, \text{lambda}\_k)\}$. This reporting may be accomplished using a management (e.g. CoAP) packet to the LM agent (or NMS). Based on this information, a directed graph may be constructed whose vertices are the different nodes in the network and directed edges $n\_i \to n\_j$ indicate that $n\_i$ can observe $n\_j$. Each edge is labeled with the rate $\text{lambda}_{ij}$ at each $n\_i$ observes a packet emitted by $n\_j$. One or more observer nodes $n\_j$ may be selected that maximize the number of observed nodes. Also, observer nodes that have the best "view" of a given node (i.e., the highest coefficient lambda) may be favored over others.

As depicted in FIG. 10, an algorithm that iteratively selects the node with the largest number of observed nodes in its RF domain may be used. This algorithm ensures the coverage criterion, and also yields an acceptable solution in terms of traffic overhead.

The algorithm may also be easily extended to account for a notion of robustness (e.g., simply by including nodes multiple times in L_observed). In another embodiment, an algorithm that uses more metrics to determine what counts as "observed" may be used. This may include, for example, physical proximity, signal strength, number of packets observed, etc. This may make it possible to determine nodes that are in the proximity of the observing node effectively. Such metrics could be retrieved from an NMS system.

In terms of confidence and responsiveness, the algorithm may adjust the size of the Bloom filters as well as the reporting rates of the various observers so as to meet the requirements. Classic Bloom filters use $1.44*\log\_2(1/f)$ bits of space per element, where f is the false positive rate of the Bloom filter. Note that, depending on whether observers report nodes that are alive or unheard of, a false positive at the Bloom filter level may correspond either to a missed node failure (i.e., a false negative) or to an incorrect alert (i.e., a false positive). In both cases, the Bloom filter size may be adjusted to meet the requirements of the user.

Another important parameter affects both confidence and responsiveness: the reporting rate r of an observer. Assuming that packet emissions can be modeled as a Poisson process, the probability of a false positive for a given node $n_j$ observed by a node $n\_i$ is $P_{false}(r\_i) = \exp(-\text{lambda}\_j\, r\_i)$. One of skill in the art will appreciate that higher reporting rates lead to larger false positive rates and larger traffic overheads. However, the reporting rate is lower-bounded by the responsiveness. As a result, $r\_i$ may be set to the minimum value that yields both the desired rate of false positive and the desired responsiveness. If incompatible, the LM shall notify the NMS and/or the application.

In an illustrative embodiment, the optimization may be based on a strategy that combines a simple greedy heuristic for assigning observed nodes to observer nodes and closed-form derivations of the Bloom filter size and reporting time, it is possible to obtain an algorithm that is capable of fulfilling the first four criteria listed above. However, the resulting traffic overhead might be suboptimal in some cases, since the assignment is completely decoupled from the reporter parameterization. For example, in the case where an observer node needs to report a set of 10 nodes in which 5 nodes have responsiveness requirements around 10 seconds and 5 nodes have responsiveness requirements around 10 ms. In this case, the observer node will need to report all these nodes at a very high rate, instead of having two observer nodes, each specialized for a given type of node or nodes. Other examples of heterogeneity relative to the confidence will lead to similar suboptimal choices.

According to the techniques herein, this limitation may be overcome with a bio-inspired optimization metaheuristic called Ant Colony Optimization (ACO), which has never before been considered in the context of optimization of identification of observer nodes within a computer network, let alone a LLN. The ACO algorithm mimics the behavior of ants, and in particular, their ability to collectively solve complex problems. For example, an ant may be considered as a simple computational agent that iteratively constructs a solution for the problem at hand. At each iteration of the algorithm, each ant moves from a state x to another state y, thereby incrementing its intermediate solution, based on two criteria: (i) the desirability $\text{eta}_{xy}$ of the transition from state x to state y and (ii) the trail level on the transition x to y. The desirability is a measure of the a priori quality of the transition x to y based on some heuristic similar to the one used in the greedy algorithm described above. The trail level denotes the a posteriori quality of the transition x to y, and is computed by allowing each ant to lay some pheromones on the path it has taken once it has completed its run (i.e., it has built a complete candidate solution). The amount of pheromone laid by an ant is proportional to the quality of its solution, and pheromones decay as the algorithm progresses, thereby allowing the escape from local minima.

In the context of optimized observer node identification, an ant k may perform a state transition by assigning an observed node n_j to an observer n_i. The ant picks an unassigned observed node from L_observed, and assigns it to n_i with a probability $p^k_{ij}$, as shown in FIG. 11, Equation 1, where O(i) is the set of potential observers of n_j, and alpha, beta are parameters controlling the relative importance of the desirability and the trail level. The desirability $eta^k_{ij}$ is inversely proportional to the traffic overhead $I'_{ij}$ induced by this assignment, which can be computed by Equation 2 (FIG. 11), where $N_i$ is the number of nodes observed by n_i, $b_i$ is the per-element size of the Bloom filter for the desired accuracy, and $r_i$ is the reporting rate. Note that these three quantities need to be computed as if n_j was indeed observed by n_i, using the same rules as in the greedy algorithm reported earlier.

After a complete solution is built (i.e., complete coverage is achieved), the overall traffic overhead $D_k$ is evaluated, by summing $I'_{ij}$ for all transitions during the run. The trails are then updated with Equation 3 (FIG. 11), with rho the evaporation rate, which controls the exploration behavior of the algorithm, and therefore its ability to escape local minima, and Equation 4 (FIG. 11) where Q is a constant.

Each iteration of the ACO algorithm consists therefore of one step in which ants probabilistically generate their solutions, and another step where pheromones are updated. The algorithm may continue indefinitely or be terminated upon fulfilling some criterion of convergence (e.g., the best performing solution is stable over time). However, in one illustrative embodiment, the intrinsic adaptability of ACO (provided by the pheromone evaporation) may be used to adjust the observer nodes in real time. For example, the techniques herein may include a mechanism whereby nodes within the network regularly update the FAR with a list of nodes they can hear in their vicinity, as well as the corresponding rate lambda. In one embodiment, the nodes update the FAR at regular intervals. In another embodiment, they use an adaptive strategy in which they update the FAR only if the list has changed significantly, either in terms of the heard nodes, or in terms of the rates. Also, instead of sending a large packet containing the list, the observing node can send a "refresh" packet using a special bit to denote that the previous list sent to the FAR is the same and the FAR should refresh the "last time received" corresponding to this observing node. It can also specify only a list of nodes that are absent and list of new nodes from the last list it sent. This again can be achieved using qualifiers corresponding to addition or subtraction as well as a special bit to denote that this packet contains only changes. Using this mechanism over time will result in much less traffic arising from this invention as time passes. In another embodiment, if a parent of a large sub-DAG receives a large number of smaller transit packets containing this information, it can choose to aggregate all the information and send one packet only. This too will result in significant traffic reduction.

As the FAR continues to receive packets, it may continuously compute the best solution using the ACO-based algorithm described above, and notify changes to the observers in real time.

The techniques described herein, therefore, provide for liveness reporting using a distributed approach. In particular, the techniques herein provide for node liveness detection in a network, e.g., an LLN, which eliminates the need for actively or passively detecting node activity. Instead, remote observer nodes are utilized to perform local traffic observation. Thus, the efficiency of such a process may be greatly increased, such that the detection occurs virtually in real-time. As should be understood, increasing efficiency by, e.g., reducing bandwidth consumption, in an LNN is critical.

Figure 12:
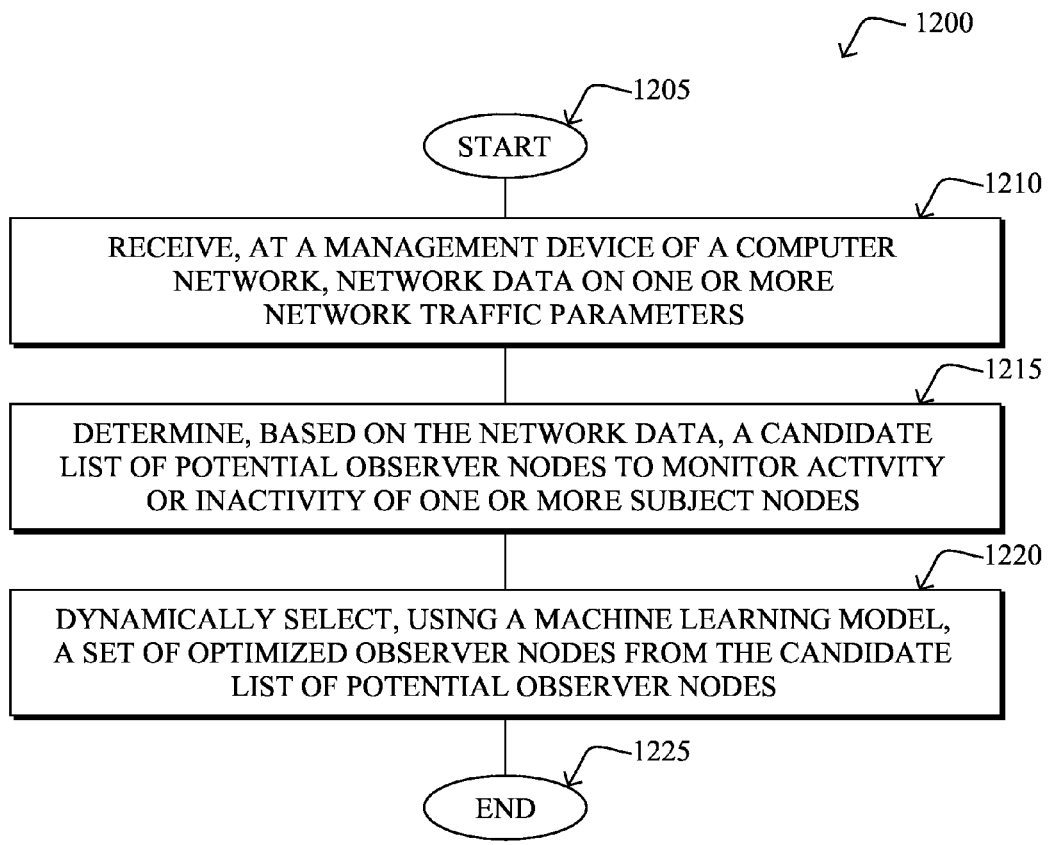
FIG. 12 illustrates an example simplified procedure for liveness reporting using a distributed approach in a communication network, particularly from the point of view of a management device.

FIG. 12 illustrates an example simplified procedure 1200 for learning machine based observer node selection, particularly from the perspective of a management device.

The procedure 1200 may start at step 1205, and continue to step 1210 where, as described above, a management device of a computer network may receive data on one or more network traffic parameters. As shown in step 1215, the management device may then determine, based on the network data, a candidate list of potential observer nodes to monitor activity or inactivity of one or more subject nodes. The management device may then dynamically select, using a machine learning model, a set of optimized observer nodes from the candidate list of potential observer nodes, as shown in step 1220. Advantageously, the techniques herein require minimal overhead in contrast with existing techniques. Illustratively, the simplified procedure may end at step 1225.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 1200 is described separately, certain steps from each procedure may be incorporated into each other procedure, and the procedures are not meant to be mutually exclusive.

While there have been shown and described illustrative embodiments that provide for performing liveness detection using a distributed approach, it is to be understood that various other adaptations and modifications may be made within the spirit and scope of the embodiments herein. For example, the embodiments have been shown and described herein primarily with relation to LLN networks. However, the embodiments in their broader sense are not as limited, and may, in fact, be used with other types of networks and/or protocols.

Moreover, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a network, e.g., an LLN, a processor coupled to the at least one network interface, and a memory configured to store program instructions executable by the processor. Further, it is expressly contemplated that the components and/or elements described herein can be implemented as software being stored on a tangible, non-transitory computer-readable medium (e.g., disks/CDs/RAM/EEPROM/etc.) having program instructions executable by a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
    receiving, at a management device of a computer network, network data associated with one or more network traffic parameters;

19 determining, by the management device based on the network data, a candidate list of potential observer devices of the computer network to dynamically monitor activity or inactivity of one or more subject devices in the computer network;
dynamically selecting, by the management device using a machine learning model, a set of optimized observer devices from the candidate list of potential observer devices, wherein the machine learning model uses an ant colony optimization (ACO) algorithm to dynamically select a set of optimized observer nodes; and
causing the selected optimized observer devices to generate and repot activity reports about the one or more subject devices in the computer network back to the management device, wherein the selected optimized observer devices provide a distributed reporting of the one or more subject devices in the computer network.

2. The method as in claim 1, wherein determining further comprises:
identifying a value associated with each of the one or more potential observer nodes for one or more parameters selected from the group consisting of a confidence parameter, a reporting rate parameter, a link quality parameter, a number of neighbors parameter, a responsiveness parameter, a network coverage parameter, and a redundancy parameter; and
constructing a directed graph based on the value of the one or more parameters to identify the candidate list of potential observer devices.

3. The method as in claim 2, wherein the candidate list of potential observer devices is selected based on the value of the one or more parameters meeting or exceeding a desired criteria.

4. The method as in claim 1, wherein dynamically selecting further comprises:
determining a network coverage value associate one or more subsets of potential observer devices from the candidate set of observer devices;
determining a network traffic impact value associated with each of the one or more subsets; and
selecting one of the one or more sets of potential observer devices having an optimal combination of the network coverage value and the network traffic impact value as the set of optimized observer nodes.

5. The method as in claim 4, further comprising:
dynamically monitoring in real time the set of optimized observer nodes to ensure that an optimization value continues to meet or exceed a desired criteria.

6. The method as in claim 1, wherein the management device is a capable device, a Field Area Router (FAR), or a network management server (NMS).

7. An apparatus, comprising:
one or more network interfaces to communicate within a computer network;
a processor coupled to the network interfaces and configured to execute one or more processes; and
a memory configured to store a process executable by the processor, the process when executed operable to:
receive, at a management device of a computer network, network data on one or more network traffic parameters;
determine, based on the network data, a candidate list of potential observer devices of the computer network to dynamically monitor activity or inactivity of one or more subject devices in the computer network;

20 dynamically select, using a machine learning model, a set of optimized observer devices from the candidate list of potential observer devices, wherein the machine learning model uses an ant colony optimization (ACO) algorithm to dynamically select a set of optimized observer nodes; and
cause the selected optimized observer devices to generate and report activity reports about the one or more subject devices in the computer network back to the management device, wherein the selected optimized observer devices provide a distributed reporting of the one or more subject devices in the computer network.

8. The apparatus as in claim 7, wherein the process when executed is further operable to:
identify a value associated with each of the one or more potential observer devices for one or more parameters selected from the group consisting of a confidence parameter, a reporting rate parameter, a link quality parameter, a number of neighbors parameter, a responsiveness parameter, a network coverage parameter, and a redundancy parameter; and
construct a directed graph based on the value of the one or more parameters to identify the candidate list of potential observer nodes.

9. The apparatus as in claim 8, wherein the candidate list of potential observer devices is selected based on the value of the one or more parameters meeting or exceeding a desired criteria.

10. The apparatus as in claim 7, wherein the process when executed is further operable to:
determine a network coverage value associate one or more subsets of potential observer devices from the candidate set of observer devices;
determine a network traffic impact value associated with each of the one or more subsets; and
select one of the one or more sets of potential observer nodes having an optimal combination of the network coverage value and the network traffic impact value as the set of optimized observer devices.

11. The apparatus as in claim 10, wherein the process when executed is further operable to:
dynamically monitor in real time the set of optimized observer devices to ensure that an optimization value continues to meet or exceed a desired criteria.

12. The apparatus as in claim 7, wherein the management device is a capable device, a Field Area Router (FAR), or a network management server (NMS).

13. A tangible, non-transitory, computer-readable media having software encoded thereon, the software, when executed by a processor on a device in a frequency-hopping communication network that operates according to a common broadcast slot for the network that simultaneously overlays a configured portion of all independently determined unicast listening slots in the network, operable to:
receive, at a management device of a computer network, network data on one or more network traffic parameters;
determine, based on the network data, a candidate list of potential observer devices of the computer network to dynamically monitor activity or inactivity of one or more in the computer network;
dynamically select, using a machine learning model, a set of optimized observer devices from the candidate list of potential observer devices, wherein the machine learning model uses an ant colony optimization (ACO) algorithm to dynamically select a set of optimized observer nodes; and cause the selected optimized observer devices to generate and report activity reports about the one or more subject devices in the computer network back to the management device, wherein the selected optimized observer devices provide a distributed reporting of the one or more subject devices in the computer network.

14. The computer-readable medium as in claim 13, wherein the software when executed is further operable to:

identify a value associated with each of the one or more potential observer devices for one or more parameters selected from the group consisting of a confidence parameter, a reporting rate parameter, a link quality parameter, a number of neighbors parameter, a responsiveness parameter, a network coverage parameter, and a redundancy parameter; and construct a directed graph based on the value of the one or more parameters to identify the candidate list of potential observer devices.

15. The computer-readable medium as in claim 13, wherein the software when executed is further operable to:

determine a network coverage value associate one or more subsets of potential observer devices from the candidate set of observer devices;

determine a network traffic impact value associated with each of the one or more subsets; and select one of the one or more sets of potential observer nodes having an optimal combination of the network coverage value and the network traffic impact value as the set of optimized observer devices.

16. The computer-readable medium as in claim 13, wherein the software when executed is further operable to:

dynamically monitor in real time the set of optimized observer nodes to ensure that an optimization value continues to meet or exceed a desired criteria.

17. The computer-readable medium as in claim 13, wherein the management device is a capable device, a Field Area Router (FAR), or a network management server (NMS).

* * * * *